(12) United States Patent
Liang et al.

(10) Patent No.: US 7,203,569 B2
(45) Date of Patent: Apr. 10, 2007

(54) MACHINE TOOL CONTROL METHODS AND DESIGNS FOR FABRICATING MESOSCOPIC SURFACE STRUCTURES ON SUBSTRATES

(75) Inventors: Erwin Wenti Liang, Ballston Lake, NY (US); Eugene George Olczak, Glenville, NY (US); Joseph Lucian Smolenski, Slingerlands, NY (US); Teeporn Paul Tanpitukpongse, Troy, NY (US); Eric Redito Robrigado, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 303 days.

(21) Appl. No.: 10/932,239

(22) Filed: Aug. 31, 2004

(65) Prior Publication Data

US 2006/0047358 A1   Mar. 2, 2006

(51) Int. Cl.
G06F 19/00 (2006.01)
B23B 3/00 (2006.01)

(52) U.S. Cl. .................. 700/186; 700/159; 700/193; 82/118

(58) Field of Classification Search ............ 700/159, 700/186, 191, 193; 144/136.1; 82/1.11, 82/1.2, 117–118, 173
See application file for complete search history.

(56) References Cited

U.S. PATENT DOCUMENTS

| | | | |
|---|---|---|---|
| 5,506,786 A * | 4/1996 | Itoh et al. ............... 700/175 |
| 5,771,328 A | 6/1998 | Wortman et al. | |
| 5,917,664 A | 6/1999 | O'Neill et al. | |
| 6,091,547 A | 7/2000 | Gardiner et al. | |
| 6,237,452 B1 * | 5/2001 | Ludwick et al. ............... 82/12 |
| 6,354,709 B1 | 3/2002 | Campbell et al. | |
| 6,356,391 B1 | 3/2002 | Gardiner et al. | |
| 6,430,465 B2 * | 8/2002 | Cutler ...................... 700/193 |
| 2003/0035231 A1 | 2/2003 | Epstein et al. | |
| 2003/0058553 A1 | 3/2003 | Epstein et al. | |
| 2004/0035266 A1 * | 2/2004 | Montesanti et al. ......... 82/1.11 |
| 2005/0223858 A1 * | 10/2005 | Lu et al. ...................... 82/173 |

\* cited by examiner

Primary Examiner—Alexander Kosowski
(74) Attorney, Agent, or Firm—Andrew J. Caruso; William E. Powell, III

(57) ABSTRACT

There is provided a machining tool for machining a workpiece on a workpiece support in response to control signals. The machining tool includes a cutting tool configured to cut a surface of the workpiece. The machining tool also includes a first displacement mechanism and a second displacement mechanism. The first displacement mechanism arranged to displace the cutting tool relative to the workpiece in a first set of coordinates in response to the control signals. The second displacement mechanism supported by the first translation mechanism and arranged to displace the cutting tool relative to the workpiece in a second set of coordinates, the second displacement mechanism capable of a higher frequency response than the first displacement mechanism. The machining tool also includes a controller configured to receive the control signals and synchronize the displacement of the cutting tool due to the first displacement mechanism with the displacement of the cutting tool due to the second displacement mechanism.

32 Claims, 5 Drawing Sheets

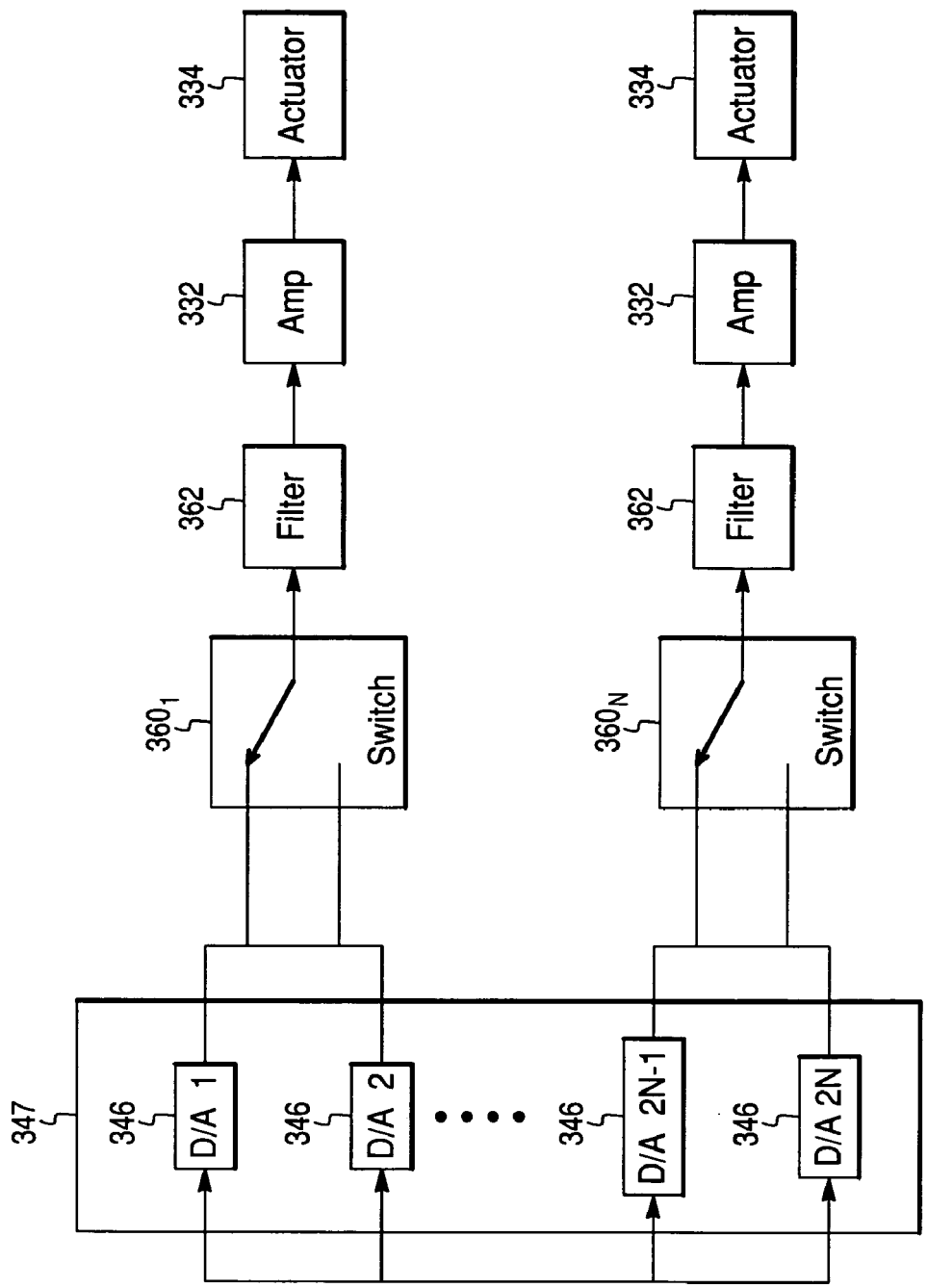

MACHINE TOOL CONTROL METHODS AND DESIGNS FOR FABRICATING MESOSCOPIC SURFACE STRUCTURES ON SUBSTRATES

FIELD OF THE INVENTION

This invention is related generally to machine tool control methods, and a machine tool apparatus.

BACKGROUND OF THE INVENTION

Machining tools for machining structures in the surface of a workpiece are known. For example computer numerically controlled (CNC) turning or milling machines can machine grooves in a workpiece by controlling the displacement of a cutting tool relative to the workpiece.

In a typical application, a workpiece is mounted on or bonded to a surface of a drum. The drum is controlled to rotate as the cutting tool is displaced both into and along the workpiece.

Some CNC turning or milling machines include a pair of relatively massive slides that move along orthogonal axes to displace the cutting tool along and into the workpiece. In the case of applications with a rotating drum support, one of the directions that the cutting tool is displaced is along the rotational axis of the drum, and another direction is into the workpiece.

Other CNC turning or milling machines include a fast tool servo (FTS) with a piezoelectric actuator, for example, to displace the cutting tool relative to the work piece. The piezoelectric actuator displaces the cutting tool based upon control signals received, and the cutting tool is displaced relative to the workpiece, either into the workpiece, or laterally relative to the surface of the workpiece.

SUMMARY OF THE INVENTION

In accordance with one embodiment of the present invention, there is provided a machining tool for machining a workpiece on a workpiece support in response to control signals. The workpiece comprises: a cutting tool configured to cut a surface of the workpiece; a first displacement mechanism arranged to displace the cutting tool relative to the workpiece in a first set of coordinates in response to the control signals; a second displacement mechanism supported by the first translation mechanism and arranged to displace the cutting tool relative to the workpiece in a second set of coordinates, the second displacement mechanism capable of a higher frequency response than the first displacement mechanism; and a controller configured to receive the control signals and synchronize the displacement of the cutting tool due to the first displacement mechanism with the displacement of the cutting tool due to the second displacement mechanism.

According to one aspect of this embodiment, the controller comprises: a displacement determination unit that determines a target displacement of the cutting tool in the second set of coordinates and provides target displacement digital signals based on the determined target displacement; a digital to analog unit comprising a plurality of digital to analog converters configured to receive respective of the target displacement digital signals from the displacement determination unit and convert the target displacement digital signals to target displacement analog signals; and at least one switch configured to alternate which digital to analog converters release respective of the target displacement analog signals.

In accordance with another embodiment of the present invention, there is provided a machining tool for machining a workpiece on a workpiece support in response to control signals. The machining tool comprises: a cutting tool configured to cut a surface of the workpiece; a first displacement mechanism arranged to displace the cutting tool relative to the workpiece in a first set of coordinates in response to control signals, the first displacement mechanism configured to displace the cutting tool in a first direction and in a second direction so as to define a number of discrete paths along the workpiece based upon the control signals, wherein the workpiece support comprises a cylindrical drum, the first direction is an angular displacement, $\theta$, about an axis of the drum, the second direction is along the axis of the drum, and the discrete paths are rings; a second displacement mechanism supported by the first translation mechanism and arranged to displace the cutting tool relative to the workpiece in a second set of coordinates; and a controller configured to receive the control signals and synchronize the displacement of the cutting tool due to the first displacement mechanism with the displacement of the cutting tool due to the second displacement mechanism. The controller comprises: a displacement determination unit that determined a target displacement of the cutting tool in the second set of coordinates and provides target displacement digital signals based on the determined target displacement; a plurality of digital to analog converters configured to receive respective of the target displacement digital signals from the displacement determination unit and convert the target displacement digital signals to target displacement analog signals; and a switch configured to alternate which digital to analog converter releases a respective of the target displacement analog signals based upon the control signals.

In accordance with another embodiment of the present invention, there is provided a method of machining a workpiece in response to control signals. The method comprises: providing a cutting tool configured to cut a surface of the workpiece; displacing the cutting tool relative to the workpiece in a first set of coordinates in response to the control signals using a first displacement mechanism; displacing the cutting tool relative to the workpiece in a second set of coordinates using a second displacement mechanism, the second displacement mechanism capable of a higher frequency response than the first displacement mechanism; and synchronizing the displacement of the cutting tool in the first set of coordinates with the displacement of the cutting tool in the second set of coordinates.

In accordance with an aspect of this embodiment, the displacing the cutting tool relative to the workpiece in a second set of coordinates comprises: determining a target displacement of the cutting tool in the second set of coordinates; providing target displacement digital signals based on the determined target displacement; converting the target displacement digital signals to target displacement analog signals using a plurality of digital to analog converters; and switching which digital to analog converter releases a respective of the target displacement analog signals.

BRIEF DESCRIPTION OF THE DRAWINGS

FIG. 6 is a schematic illustrating digital to analog converters and multiple switches according to an embodiment of the invention.

DETAILED DESCRIPTION OF THE PREFERRED EMBODIMENTS

Reference will now be made in detail to presently preferred embodiments of the present invention. Wherever possible, the same reference numbers will be used throughout the drawings to refer to the same or like parts.

The present invention is applicable to machining deterministic or randomized mesoscopic (micro-and macro-scaled) structures or textures on a work piece surface, such as a mastered surface.

The present inventors have realized that there is a need to implement a machining tool having both a relatively slow cutting tool displacement mechanism and a faster cutting tool displacement mechanism where displacements due to the displacement mechanisms are synchronized with each other. The relatively slow cutting tool displacement mechanism is slower than the faster cutting tool displacement mechanism in the sense that faster cutting tool displacement mechanism is capable of a higher frequency response than the relatively slow cutting tool displacement mechanism. The synchronization preferably is based on the same set of control signals, for example, that are typically sent to control the relatively slow cutting tool displacement mechanism.

Such synchronization allows for a machining tool system where multiple passes may be made over the same cutting tool path, where the position of the cutting tool displacement is substantially identical for each of the passes. Thus, the features formed in a workpiece with the cutting tool may be formed with good precision.

Further such synchronization allows both the slower and faster cutting tools to be controlled using a single set of control signals. Thus, the control is simplified by using a single set of control signals.

Further the switch allows for a very fast control of the signal, for example in the nanosecond range. Thus very precise synchronization is possible.

Figure 1:
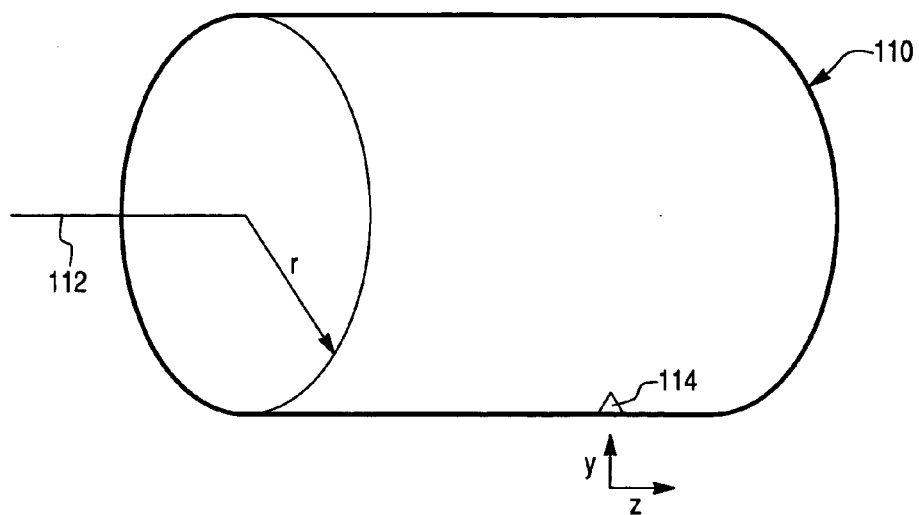
FIG. 1 is a schematic of a drum workpiece support illustrating the coordinates thereof.

FIG. 1 shows a drum workpiece support for supporting a workpiece (not shown) thereon to illustrate the coordinates of a machining tool system employing a cutting tool according to an embodiment of the invention. The drum 110 has a length L and a radius r. The drum 110 can be rotated about its axis 112 along an angular direction θ. Additionally, a cutting tool 114 may be moved laterally along the axis 112 along the z axis, or along the y axis radially toward or away from the axis 112 (toward or away form the workpiece).

Figure 2:
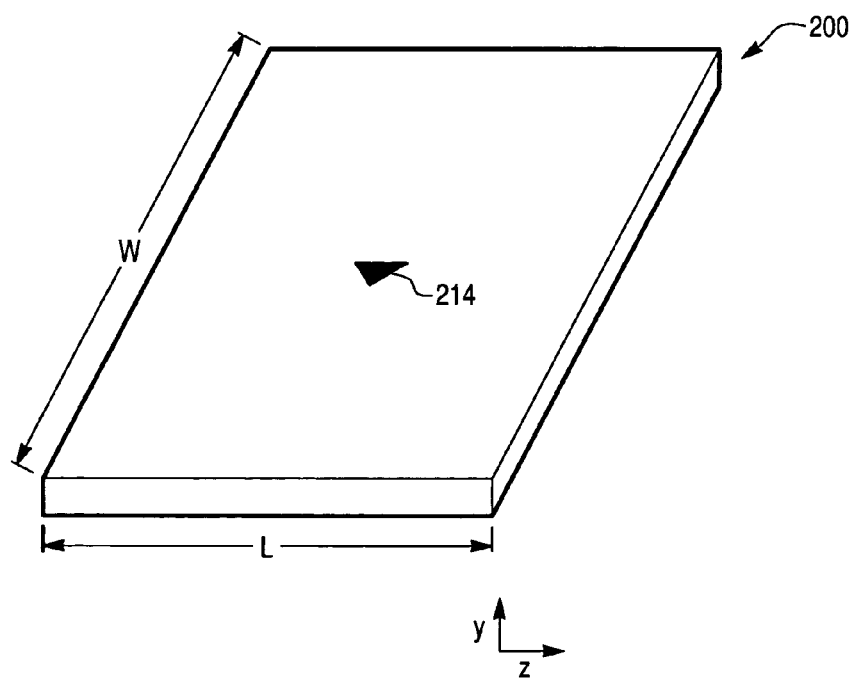
FIG. 2 is a schematic of a substantially planar workpiece support illustrating the coordinates thereof.

FIG. 2 shows a substantially planar workpiece support for supporting a workpiece thereon to illustrate the coordinates of a machining tool system employing a cutting tool according to another embodiment of the invention. The workpiece support 200 comprises a substantially planar surface upon which the workpiece (not shown) is supported. The workpiece support 200 has a length L and a width W and can be translated along its width W, for example along the x axis. The cutting tool 214 may be moved laterally along the z axis along L, or along the y axis toward or away from the surface of the workpiece support 200.

Figure 3:
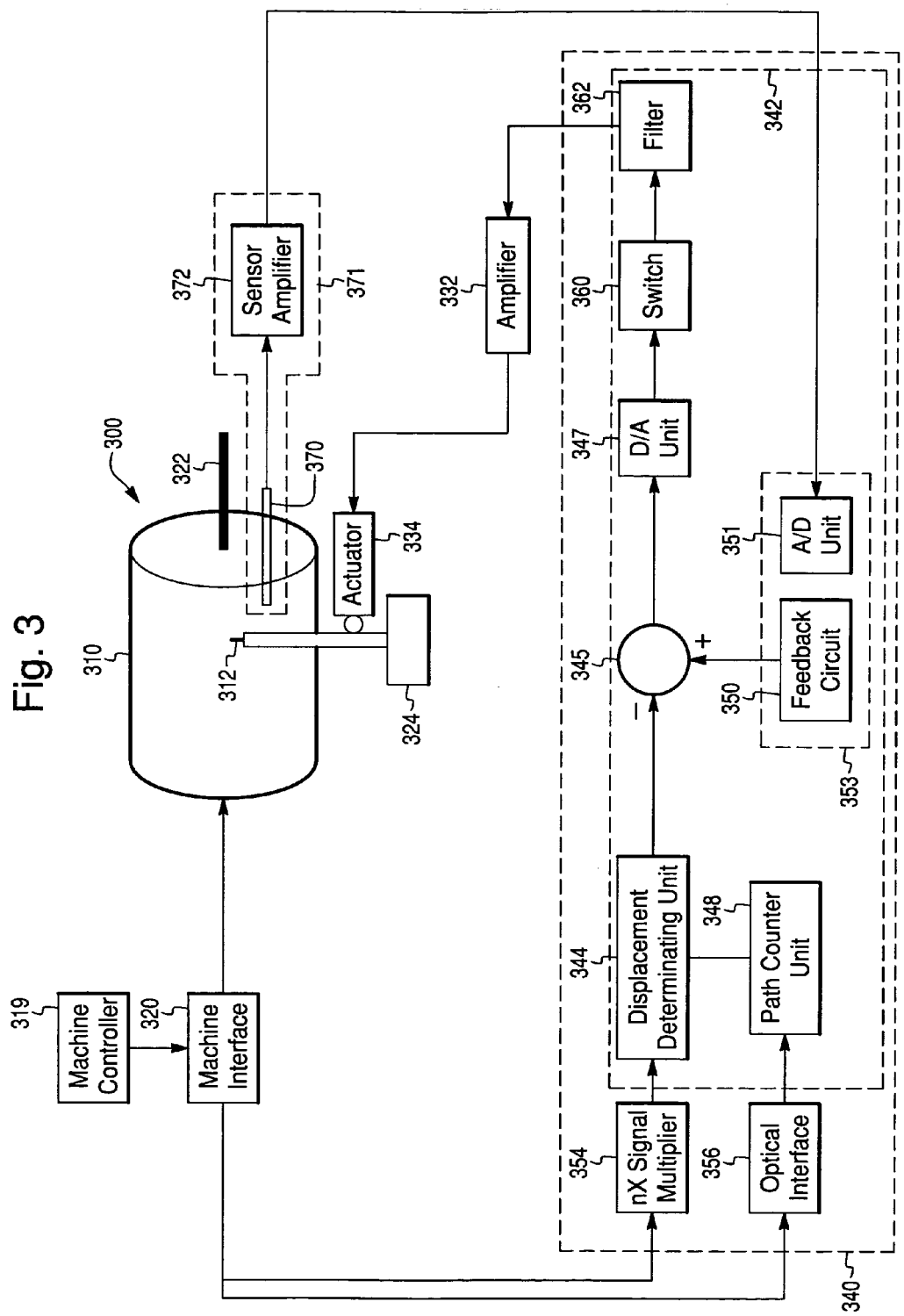
FIG. 3 is a schematic of a machining tool according to an embodiment of the invention.

FIG. 3 is a schematic of a machining tool 300 according to an embodiment of the invention. The machining tool 300 includes a workpiece support 310. The workpiece support 310 may comprise a rotating drum as shown in FIG. 3 (or FIG. 1). Alternatively, the workpiece support may comprise a substantially planar surface, such as shown in FIG. 2, or may have some other geometry.

The machining tool 300 includes a cutting tool 312 that is configured to be displaced toward or away from the surface of the workpiece support 310, and thus toward and into any workpiece or away from any workpiece on the workpiece support. The cutting tool 312 may also be displaced laterally relative to the surface of the workpiece support 310 and the workpiece thereon.

The machining tool 300 has a first displacement mechanism arranged to displace the cutting tool 312 relative to the workpiece. The first displacement mechanism displaces the cutting tool 312 relative to the workpiece in response to control signals. The control signals originating from a machine controller 319 comes through a machine interface 320, such as a lathe interface in the case that the workpiece support 312 is a drum. The control signals may be digital signals from a machine encoder or resolver (not shown) of the machine controller 319, and may be in G code and M code, for example, as is known for machine encoders. The control signals may be in the form of TTL square wave pulses or analog sine waves.

The first displacement mechanism may comprise a spindle drive 322 and a slide 324, for example. The spindle drive 322 drives the workpiece support 310 about its axis in a first direction along an angular displacement θ (See FIG. 1 illustrating angular displacement θ). The slide 324 displaces the cutting tool 312 along the axis of the workpiece support 310. Both the spindle drive 322 and the slide 324 movement are controlled based on the control signals from the machine controller 320.

The machining tool 300 has a second displacement mechanism arranged to displace the cutting tool 312 relative to the workpiece. The second displacement mechanism displaces the cutting tool 312 relative to the workpiece in response to the control signals originating from the machine interface 320. The set of control signals are the same as those used to control the first displacement mechanism.

The second displacement mechanism displaces the cutting tool 312 relative to the workpiece in a second set of coordinates. For example, for a workpiece support 310 that is a drum, the second set of coordinates may include the direction along the axis of the drum (the z axis), and the direction radially away or toward the axis (the y axis) (see FIG. 1).

Preferably the second displacement mechanism is capable of a higher frequency response than the first displacement mechanism. Because the higher frequency motion of a second displacement mechanism is synchronized with a lower frequency motion, surface structures with multiple scales may be formed with traditional control signals at a much higher speed. The microstructures formed can thus have a greater range of change.

Figure 4:
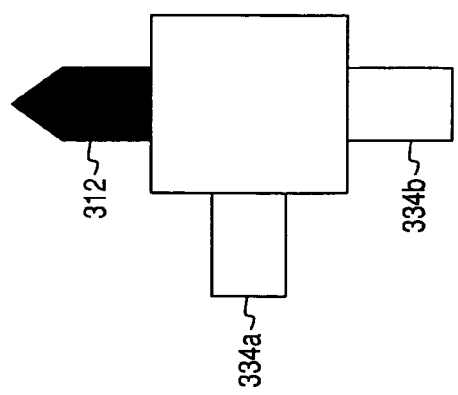
FIG. 4 is a schematic of a second displacement mechanism according to an embodiment of the invention with two piezoelectric actuators and amplifiers.

The second displacement mechanism may comprise an FTS, such as at least one piezoelectric amplifier 332 and piezoelectric actuator 334, for example. The at least one piezoelectric actuator 334 may include a first piezoelectric actuator 334a configured to displace the cutting tool in a first direction, and a second piezoelectric actuator 334b configured to displace the cutting tool in a second direction different from the first direction (see FIG. 4). The first and second direction may orthogonal to each other and may be along y-axis (into or out of the work piece), and z-axis (along the drum axis), for example. Alternatively the directions need not be orthogonal.

The machining tool 300 may also include a controller 340 configured to receive the control signals and synchronize the displacement of the cutting tool 312 due to the first displacement mechanism with the displacement of the cutting tool due to the second displacement mechanism 330.

The controller 340 includes an electronic control unit 342 including a displacement determination unit 344, digital to analog unit 347 comprising a plurality of digital to analog converters 346, a path counter unit 348, and a feedback control unit 350. Alternatively, one or more of the displacement determination unit 344, digital to analog unit 347, path counter unit 348, and feedback control unit 350 may be separate from the electronic control unit 342. The electronic control unit 342 may be a dSPACE system such as the DS1103 PPC Controller Board provided by dSPACE, or a digital signal processor (DSP) such as ChicoPlus from Innovative Integration, for example. The present invention is not limited to a particular electronic control unit.

The controller 340 also includes an nX signal multiplier/divider 354, such as an nX encoder multiplier/divider, that receives position control signals from the machine encoder of the machine interface 320, and functions to multiply the frequency of the control signals by n times in the second direction, and pass the multiplied frequency control signals to the displacement determination unit 344. In general, n is greater than or less than 1. When n is greater than 1, the nX encoder multiplier/divider functions to increase the frequency of the control signals where the increased frequency is n times the input frequency. In this case the nX signal multiplier/divider increases the resolution of the number of points in the second direction processed by the displacement determination unit 344. On the other hand, when n is less than 1, the nX signal multiplier/divider functions to decrease the frequency of the control signals where the decreased frequency is again n times the input frequency. In this case the nX encoder multiplier/divider decreases the resolution of the number of points in the second direction processed by the displacement determination unit 344. n may be an integer greater than or equal to 2, for example, such as 4, for example.

An example of the functioning of the nX signal multiplier/divider 354 is as follows. Assume that the nX signal multiplier/divider 354 is a 4× signal multiplier, and the position signals correspond to 5000 points circumferentially along the θ direction of the drum. In other words, the resolution in the θ direction for the first displacement mechanism is 5000 points. The nX signal multiplier 345 acts to increase frequency of the position signal to 4 times the input frequency. This increase in frequency increases the number of points circumferentially along the drum to 20000 through interpolation, for example, to thereby increase the resolution of points acted on by the displacement determination unit 344, and thus 20,000 points for the second displacement direction. The increased frequency signal is then fed to the displacement determination unit 344, and also acts to trigger at least one switch 360 as discussed further below.

Selecting n for the nX signal multiplier/divider 354 provides some degree of tunability to the machining tool 300. For a lower n, the resolution is decreased, but the machining speed of the machining tool 300 is increased since fewer points need be processed for a particular path along the workpiece. On the other hand, if a higher resolution, and therefore fidelity, is desired, a larger n may be chosen at the expense of the machining speed.

The controller 340 may include an optical interface 356 that provides electrical isolation and receives the trigger signals from the machine interface 320, passes the trigger signals to the path counter unit 348. The trigger signals of the control signals from machine interface 320 indicate the triggering of the first displacement mechanism.

The path counter unit 348 is configured to determine the current path that the cutting tool 312 is on. The path counter unit 348 performs this function based on the control signals from the machine interface 320, and specifically based on the trigger signals of the control signals. In the case that the workpiece support 310 is a rotating drum, the paths will correspond to rings that are to be cut into the workpiece, and the path counter unit 348 keeps track of the ring number.

The displacement determination unit 344 determines a target displacement of the cutting tool in the second set of coordinates and provides target displacement digital signals based on the determined target displacement. The displacement determination unit 344 performs this determination based on the multiplied frequency control signals from the nX signal multiplier/divider 354 and the current path determined from the path counter unit 348. Thus, the path counter unit 348 informs the displacement determination unit 344 of the current path. If it is not desired to increase the frequency of the control signals, for example so that the machining speed is higher, the displacement determination unit 344 may receive control signals without increasing their frequency, and the nX signal multiplier/divider 354 may be omitted.

The increased frequency control signals (or just the control signals if increased resolution is not desired) provides information about a position along one or more of the coordinates of the first displacement mechanism but with increased (or decreased) resolution. As an example, assume the workpiece support 310 is a rotating drum with the first displacement mechanism providing displacement along the z-axis (rotational axis) and in the θ direction, and the machining tool 300 includes a 4× signal multiplier/divider. Also assume the number of points in the θ direction around the drum is 5000 for the first displacement mechanism, and the control signal indicates that the $1000^{th}$ point (about one-fifth of the way around the drum from the first point) along the θ direction is the current point for the first displacement mechanism. The 4× signal multiplier/divider 354 provides increased frequency signals corresponding to 4 points in the second set of coordinates (for the second displacement mechanism) for every point in the first set of coordinates (for the first displacement mechanism), and thus provides for 4 points around the $1000^{th}$ point. The displacement determination unit 344 uses the multiplied frequency signal, which is indicative of one of these 4 points indicating position around the drum, and the current path (or ring), and determines a target displacement of the cutting tool in the second set of coordinates corresponding to the second displacement mechanism.

For the sake of illustration, assume that the current point corresponds to a current angle $\theta_{cur}$ and that the current path is $p_{cur}$. Also assume that the second set of coordinates are given by $y_2$ and $z_2$. The displacement calculation unit 344 will determine the target displacement in the second set of coordinates as $y_2 = fy2(\theta_{cur}, p_{cur})$, and $z_2 = fz2(\theta_{cur}, p_{cur})$, where $fy2(\theta_{cur}, p_{cur})$ and $fz2(\theta_{cur}$ and $p_{cur}$. In other words the target displacement in the second set of coordinates is a function of the displacement in the first set of coordinates as indicated by the control signals.

The displacement determination unit 344 provides target displacement digital signals based on the determined target displacement. The plurality of digital to analog converters 346 are configured to receive respective of the target displacement digital signals from the displacement determination unit 344 and convert the target displacement digital signals to target displacement analog signals.

The displacement determination unit 344 may determine the target displacement by calculating the displacement on the fly as the multiplied frequency control signals are received from the nX signal multiplier/divider 354. In this case, the target displacement determination unit 344 may include a processor with appropriate software or firmware to calculate the target displacement as desired. Alternative, the target displacement may be pre-calculated and the pre-calculated values of the target displacement may be received from external to the displacement determination unit 344. The target displacement may be pre-calculated and stored in a memory external to the displacement determination unit 344, and streamed into the displacement determination unit 344 as the multiplied frequency control signals are received.

The machining tool 300 includes at least one switch 360 configured to alternate which digital to analog converter 346 releases the analog signals corresponding to a respective of the target displacement digital signals received from the displacement determination unit 344. The at least one switch 360 may comprise a gate, for example. The at least one switch 360 alternates which digital to analog converter 346 releases a respective of the target displacement analog signals based upon the control signals, for example, based upon the multiplied frequency control signal from the nX signal multiplier/divider 354.

The use of a switch or switches to alternate between the digital to analog converters 346 increases the machining speed of the machining tool 300 for a particular resolution on the workpiece by increasing the rate at which analog signals may be sent to the second displacement mechanism. This is accomplished by employing multiple digital to analog converters 346 (see FIGS. 5 and 6) on the digital to analog unit, and alternately switching between the converters 346.

Figure 5:
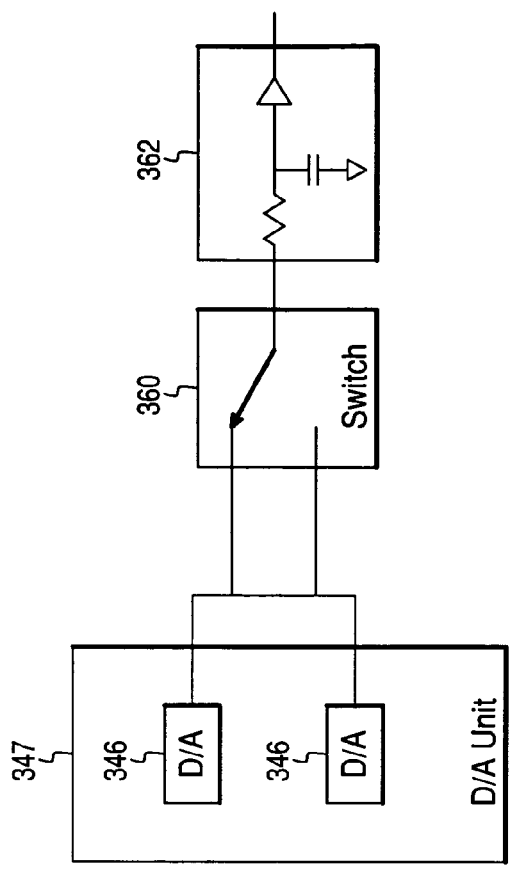
FIG. 5 is a schematic illustrating digital to analog converters and a single switch according to an embodiment of the invention.

FIG. 5 illustrates an embodiment with two digital to analog converters 346 on the digital to analog unit 347, and a single switch 360. In general, the number of digital to analog converters 346 may be more than two, however.

FIG. 6 illustrates another embodiment with a plurality of digital to analog converters 346 on the digital to analog unit 347, and N switches $360_i$, where N is greater than 1. In this embodiment, the plurality of digital to analog converters 346 are divided into a plurality of groups, where each group corresponds to a different switch of the plurality of switches $360_i$. Each of the switches $360_i$ is configured to alternate which digital to analog converter 346 of the converters in its corresponding group releases respective of the target displacement analog signals.

Further the output of each of the groups of digital to analog converters may be directed to a different piezoelectric amplifier 332 and piezoelectric actuator 334. For N piezoelectric actuators, each piezoelectric actuator 344 of the N piezoelectric actuators corresponding to a different group of the digital to analog converters 346. As an alternative to piezoelectric actuators, voice coils may be used.

The machining tool may comprise one or more filter buffers 362 arranged to receive and smooth the target displacement analog signals from the digital to analog converters 346. As shown in FIGS. 5 and 6, there may be a filter buffer 362 corresponding to each of the switches 360 of the at least one switch. The signal from the filter buffers 362 is passed on to the second displacement unit. The smoothing can help to eliminate chatters during machining.

The target displacement analog signals are received from each filter buffer 362 by the second displacement mechanism, which in response displaces the cutting tool 312. For example, if the second displacement mechanism comprises at least one piezoelectric amplifier 332 and corresponding piezoelectric actuator(s) 334, the amplifier 332 amplifies the target displacement analog signal and passes the amplified signal to its respective piezoelectric actuator 334.

The machining tool 300 may also include a sensor unit 371, including a position sensor 370 and a sensor amplifier 372, and a feed back control unit 353, including an analog to digital unit 351 and feed back control circuit 350, to adjust the target displacement control signals as necessary. The position sensor unit 371 is arranged to detect the position of the cutting tool 312, and to provide a position signal indicative of the detected position of the cutting tool 312 to the feedback control unit 353. The feedback control unit 353 is arranged to receive the position signal, amplified by the sensor amplifier 372 as desired, and adjust the target displacement digitals signals based on the position signal. The analog to digital unit 351 comprises one or more analog to digital converters to convert the position signal from the sensor amplifier 372 to digital and provide a digital position signal to the feedback control circuit 350. The feedback control circuit 350 provides a feedback signal to correct the target displacement signal at the combiner 345. The feedback control helps compensate for hysteretic and creep effects of the piezoelectric materials of the piezoelectric actuators, and thus enhances correct tool movement.

The determination of the target displacement depends upon the particular application. An example of determining the target displacement is as follows. Assuming that the first set of coordinates are $\theta_1$ and $z_1$, where $\theta_1$ is angular displacement of the drum of the workpiece support 310, and $z_1$ is the distance along the rotational axis of the drum. Further assume that the second set of coordinates is given by $y_2$, the distance into the workpiece, and $z_2$, along the direction of the rotational axis of the drum. In general $y_2$ and $z_2$ will be a function of $\theta_1$ and $z_1$. The values of $\theta_1$ and $z_1$ are determined from the control signals (which are also applied for control of the first displacement mechanism). Thus, the general formulas for $y_2$ and $z_2$ are $y_2=fy2(\theta_1, z_1)$, and $z_2=fz2(\theta_1, z_1)$. The particular formula used depends o desired shape of the pattern cut into the workpiece, such as sawtooth or sinusoidal shape.

In many applications it is desired to include random or pseudo-random modulation of the pattern cut into the workpiece. In this case the formula for the target displacement may be given as $y_2=fy2(\theta_1, z_1, fy2_{ran}(\theta_1, z_1))$, and $z_2$'$fz2_{ran}(\theta_1, z_1)$, where $fy2_{ran}(\theta_1, z_1)$ and $fz2_{ran}(\theta_1, z_1)$ are r functions. The present invention is not limited, however, to a particular function or functions for the target displacement, as the particular target displacement will depend upon the application.

Figure 7:
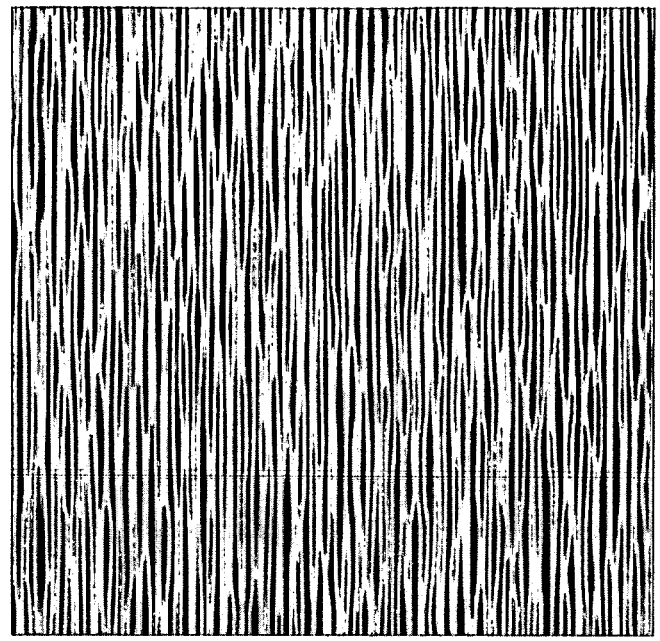
FIGS. 7 and 8 are a top view of a workpiece machined according embodiments of the present invention.
Figure 8:
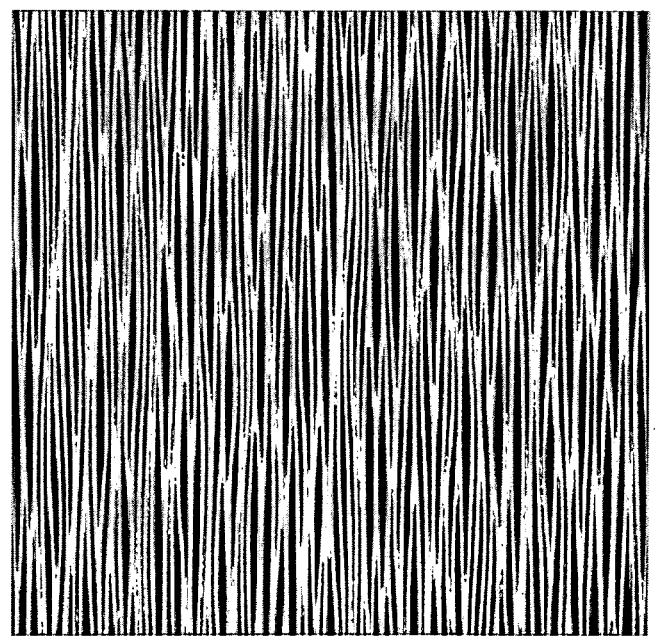

FIGS. 7 and 8 illustrate top views of workpieces with examples of particular microstructures machined therein. FIGS. 7 and 8 illustrate a number of paths cut into a 3 mm×3 mm workpiece, where the paths are subject to a pseudo random modulation. The unmodified paths (nominal paths) provide structures with a pitch, P, of 30 μm, where the width of the cutting tool is 60 μm. The second set of coordinates is given by $y_2$, (the distance into the workpiece, or the cut depth), and $z_2$ (the distance along the axis of rotation of the drum). $z_2$ is generally perpendicular to the structures shown in FIGS. 7 and 8. $y_2$ was kept constant with a constant cut depth of 27.5 μm, and target displacement along the z-direction was pseudo randomly modulated so the that the lateral distance was between limits of −15 μm and +15 μm, and a wavelength of the motion was between 100 and 200 μm. The ratio of lateral distance to wavelength determines the slope of path and thus the turning power of the intended application. In general the pseudo random modulation may be provided by a interpolated waveform that is fit through random control points, as in FIGS. 7 and 8, or by generating a broad band digitally sampled noise signal, which may be filtered and scaled to provide the desired range of amplitude or frequency, for example.

The present invention is applicable to a number of different applications. For example, microstructure may be machined in applications including diffusers, solar cell panels, reflectors, brightness enhancement films and heat/mass transfer control surfaces. For example, for thin-film solar cell applications, textured (by machining) TCO/glass/metal substrates, which provide light trapping may be formed. Angle selective specular reflectors may also be formed.

The particular first and second set of coordinates will depend on the particular application. The structures formed may have variation in one or more of amplitude, phase, period and frequency.

In embodiments of the present invention, because the high frequency motion of a second displacement mechanism, such as an FTS, is synchronized with a lower frequency motion, surface structures with multiple scales may be formed with traditional control signals at a much higher speed. The microstructures formed have a greater range of change. Machining these structures in multiple repeatable passes produces a superior surface finish.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A machining tool for machining a workpiece on a workpiece support in response to control signals, comprising:
   a cutting tool configured to cut a surface of the workpiece;
   a first displacement mechanism arranged to displace the cutting tool relative to the workpiece in a first set of coordinates in response to the control signals;
   a second displacement mechanism supported by the first displacement mechanism and arranged to displace the cutting tool relative to the workpiece in a second set of coordinates, the second displacement mechanism capable of a higher frequency response than the first displacement mechanism; and
   a controller configured to receive the control signals and synchronize the displacement of the cutting tool due to the first displacement mechanism with the displacement of the cutting tool due to the second displacement mechanism; wherein the controller comprises:
   a displacement determination unit that determines a target displacement of the cutting tool in the second set of coordinates and provides target displacement digital signals based on the determined target displacement;
   a digital to analog unit comprising a plurality of digital to analog converters configured to receive respective of the target displacement digital signals from the displacement determination unit and convert the target displacement digital signals to target displacement analog signals; and
   at least one switch to alternate which digital to analog converters release respective of the target displacement analog signals.

2. The machining tool of claim 1, wherein the at least one switch alternates which digital to analog converters release respective of the target displacement analog signals based upon the control signals.

3. The machining tool of claim 1, wherein the plurality of digital to analog converters are divided into a plurality of groups of digital to analog converters, the at least one switch comprises a plurality of switches, each of the groups corresponding to a different switch of the plurality of switches, and each switch is configured to alternate which digital to analog converter of the converters in a corresponding group of the groups release respective of the target displacement analog signals.

4. The machining tool of claim 3, wherein the second displacement mechanism comprises N actuators, each actuator of the N actuators configured to displace the cutting tool based on the target displacement analog signals, each actuator of the N actuators corresponding to a different group of the plurality of groups.

5. The machining tool of claim 4, where the actuators comprise piezoelectric actuators or voice coils.

6. The machining tool of claim 1, wherein the first displacement mechanism is configured to displace the cutting tool, based upon the control signals, in a first direction and in a second direction so as to define a number of discrete paths along the workpiece.

7. The machining tool of claim 6, wherein the workpiece support comprises a cylindrical drum, the first direction is along an angular displacement, θ, about an axis of the drum, and the second direction is along the axis of the drum.

8. The machining tool of claim 6, wherein the workpiece support comprises a substantially planar surface, and the first direction and the second direction are substantially orthogonal to each other.

9. The machining tool of claim 6, wherein the controller further comprises a path counter unit configured to determine the current path based upon the control signals, and to inform the displacement determination unit of the current path.

10. The machining tool of claim 9, wherein the workpiece support comprises a cylindrical drum, the first direction is along an angular displacement, θ, about an axis of the drum, the second direction is along the axis of the drum, and the discrete paths are rings.

11. The machining tool of claim 9, wherein the controller further comprises:
   an optical interface configured to receive trigger signals of the control signals, the trigger signals indicating the triggering of the first displacement mechanism, convert the trigger signals to optical signals, and send the optical signals to the path counter unit.

12. The machining tool of claim 6, wherein the controller further comprises:
   an nX signal multiplier/divider configured to receive the control signals, multiply the frequency of the control signals by n times in the second direction, n is a number greater than or less than 1, and pass the multiplied frequency control signals to the displacement determination unit.

13. The machining tool of claim 1, wherein the at least one switch comprises at least one gate switch.

14. The machining tool of claim 1, wherein the controller further comprises a filter buffer arranged to receive and smooth the target displacement analog signals.

15. The machining tool of claim 1, wherein the second displacement mechanism comprises at least one actuator configured to displace the cutting tool based on the target displacement analog signals.

16. The machining tool of claim 15, wherein the at least one actuator comprises N actuators, where N is an integer greater than or equal to two.

17. The machining tool of claim 16, wherein each of the N actuators is configured to displace the cutting tool in a different direction.

18. The machining tool of claim 16, wherein N is equal to two and the different directions are orthogonal to each other.

19. The machining tool of claim 1, further comprising:
a sensor unit arranged to detect the position of the cutting tool, and to provide a position signal indicative of the detected position of the cutting tool to the controller; and wherein the controller comprises a feedback control unit arranged to receive the position signal from the sensor unit and adjust the target displacement digital signals based on the position signal.

20. The machining tool of claim 19, wherein the sensor unit comprises:
a sensor detecting a position of the cutting tool and providing an unamplified position signal; and
a sensor amplifier arranged to amplify the unamplified position signal to provide the position signal.

21. The machining tool of claim 19, wherein the feedback control unit comprises:
an analog to digital converter unit arranged to receive the position signal from the sensor unit and convert the position signal to a digital position signal; and
a feed back controller circuit arranged to receive the digital position signal and adjust the target displacement digital signal based on the digital position signal.

22. The machining tool of claim 1, wherein the displacement determination unit determines the target displacement by calculating the target displacement.

23. The machining tool of claim 22, wherein the displacement determination unit calculates the target displacement according to a displacement function.

24. The machining tool of claim 23, wherein the displacement function is defined by a first function modulated by a second function, the second function being random or pseudo random.

25. The machining tool of claim 1, wherein the displacement determination unit determines the target displacement by receiving pre-calculated target displacement values.

26. A machining tool for machining a workpiece on a workpiece support in response to control signals, comprising:
a cutting tool configured to cut a surface of the workpiece;
a first displacement mechanism arranged to displace the cutting tool relative to the workpiece in a first set of coordinates in response to control signals, the first displacement mechanism configured to displace the cutting tool in a first direction and in a second direction so as to define a number of discrete paths along the workpiece based upon the control signals, wherein the workpiece support comprises a cylindrical drum, the first direction is an angular displacement, θ, about an axis of the drum, the second direction is along the axis of the drum, and the discrete paths are rings;
a second displacement mechanism supported by the first displacement mechanism and arranged to displace the cutting tool relative to the workpiece in a second set of coordinates; and
a controller configured to receive the control signals and synchronize the displacement of the cutting tool due to the first displacement mechanism with the displacement of the cutting tool due to the second displacement mechanism, the controller comprising:
a displacement determination unit that determines a target displacement of the cutting tool in the second set of coordinates and provides target displacement digital signals based on the determined target displacement;
a plurality of digital to analog converters configured to receive respective of the target displacement digital signals from the displacement determination unit and convert the target displacement digital signals to target displacement analog signals; and
a switch configured to alternate which digital to analog converter releases a respective of the target displacement analog signals based upon the control signals.

27. A method of machining a workpiece in response to control signals, comprising:
providing a cutting tool configured to cut a surface of the workpiece;
displacing the cutting tool relative to the workpiece in a first set of coordinates in response to the control signals using a first displacement mechanism;
displacing the cutting tool relative to the workpiece in a second set of coordinates using a second displacement mechanism the second displacement mechanism capable of a higher frequency response than the first displacement mechanism; and
synchronizing the displacement of the cutting tool in the first set of coordinates with the displacement of the cutting tool in the second set of coordinates; wherein displacing the cutting tool relative to the workpiece in a second set of coordinates comprises:
determining a target displacement of the cutting tool in the second set of coordinates:
providing target displacement digital signals based on the determined target displacement;
converting the target displacement digital signals to target displacement analog signals using a plurality of digital to analog converters; and
switching which digital to analog converter releases a respective of the target displacement analog signals.

28. The method of claim 27, wherein the switching is based upon the control signals.

29. The method of claim 27, wherein in the displacing the cutting tool relative to the workpiece in the first set of coordinates, the cutting tool is displaced in a first direction and in a second direction so as to define a number of discrete paths along the workpiece.

30. The method of claim 27, wherein displacing the cutting tool relative to the workpiece in the first set of coordinates, the cutting tool is displaced in a first direction and in a second direction so as to define a number of discrete paths along the workpiece.

31. The method of claim 30, wherein displacing the cutting tool relative to the workpiece in the first set of coordinates and the second set of coordinate comprises making more than one pass over each discrete path, each pass over a particular path being substantially identical in displacement of the cutting tool.

32. The method of claim 31, wherein displacing the cutting tool relative to the workpiece in a second set of coordinates comprises:

calculating a target displacement of the cutting tool in the second set of coordinates according to a displacement function, wherein the displacement function is defined by a first function modulated by a second function, the second function being random or pseudo random.

* * * * *